US012596417B2

(12) United States Patent
Ji et al.

(10) Patent No.: US 12,596,417 B2
(45) Date of Patent: Apr. 7, 2026

(54) STORAGE DEVICE PREVENTING LOSS OF DATA IN SITUATION OF LACKING POWER AND OPERATING METHOD THEREOF

(71) Applicant: Samsung Electronics Co., Ltd.,
Suwon-si (KR)

(72) Inventors: Soo-Young Ji, Suwon-si (KR);
Younggeon Yoo, Suwon-si (KR);
Brianmyungjune Jung, Suwon-si
(KR); Sung Chul Hur, Suwon-si (KR)

(73) Assignee: Samsung Electronics Co., Ltd.,
Gyeonggi-do (KR)

( * ) Notice: Subject to any disclaimer, the term of this
patent is extended or adjusted under 35
U.S.C. 154(b) by 158 days.

(21) Appl. No.: 18/305,474

(22) Filed: Apr. 24, 2023

(65) Prior Publication Data

US 2023/0384848 A1 Nov. 30, 2023

(30) Foreign Application Priority Data

May 31, 2022 (KR) ........................ 10-2022-0067029
Aug. 17, 2022 (KR) ........................ 10-2022-0102834

(51) Int. Cl.
*G06F 1/00* (2006.01)
*G06F 1/26* (2006.01)
*G06F 1/30* (2006.01)
(52) U.S. Cl.
CPC .............. *G06F 1/263* (2013.01); *G06F 1/305*
(2013.01)
(58) Field of Classification Search
CPC ................................. G06F 1/305; G06F 1/263
See application file for complete search history.

(56) References Cited

U.S. PATENT DOCUMENTS 8,400,026 B2 3/2013 Park et al.
9,484,069 B2 11/2016 Shim et al.
(Continued)

FOREIGN PATENT DOCUMENTS

JP 2020-113220 A 7/2020

OTHER PUBLICATIONS

European Search Report dated Oct. 24, 2023 for corresponding
European Patent Application No. 23168172.7.

*Primary Examiner* — Jaweed A Abbaszadeh
*Assistant Examiner* — Ayman Fatima
(74) *Attorney, Agent, or Firm* — Harness, Dickey &
Pierce, P.L.C.

(57) ABSTRACT

Disclosed is a storage device including a non-volatile
memory that inputs or outputs data at a request of a host
system, a volatile memory that temporarily stores data input
to or output from the non-volatile memory, an internal spare
power source that supplies power to a part of the volatile
memory in response to main power supplied from the host
system dropping to a first amount or less, and a storage
controller that controls the non-volatile memory and the
volatile memory. The storage controller is configured to
divide the volatile memory into area-received-duplication-
power, and at least one area-received-spare-power, in
response to the main power dropping to the first amount or
less, to redundantly supply spare power to the area-received-
duplication-power from an external spare power source and
the internal spare power source, and to supply the spare
power to the at least one area-received-spare-power from the
external spare power source.

20 Claims, 9 Drawing Sheets

(56) References Cited

U.S. PATENT DOCUMENTS

| | | | |
|---|---|---|---|
| 11,150,714 B2 | 10/2021 | Cui et al. | |
| 11,175,713 B2 | 11/2021 | Zupanc et al. | |
| 11,216,367 B2 | 1/2022 | Park et al. | |
| 2005/0138311 A1* | 6/2005 | Ko ....................... | G06F 11/1458 |
| | | | 714/E11.121 |
| 2010/0202238 A1* | 8/2010 | Moshayedi ......... | G06F 11/1666 |
| | | | 714/E11.12 |
| 2019/0042113 A1* | 2/2019 | Li .......................... | G06F 3/0685 |
| 2019/0317679 A1* | 10/2019 | Raychaudhuri ....... | G06F 3/0625 |
| 2020/0409838 A1* | 12/2020 | Park ....................... | G11C 16/30 |
| 2021/0089447 A1* | 3/2021 | Jin .......................... | G06F 1/263 |
| 2021/0255920 A1 | 8/2021 | Bernat et al. | |
| 2021/0271412 A1 | 9/2021 | Cheong | |
| 2023/0030286 A1* | 2/2023 | Abali .................. | G06F 12/0804 |

* cited by examiner

<u>100</u>

111

110

120

1100

1200

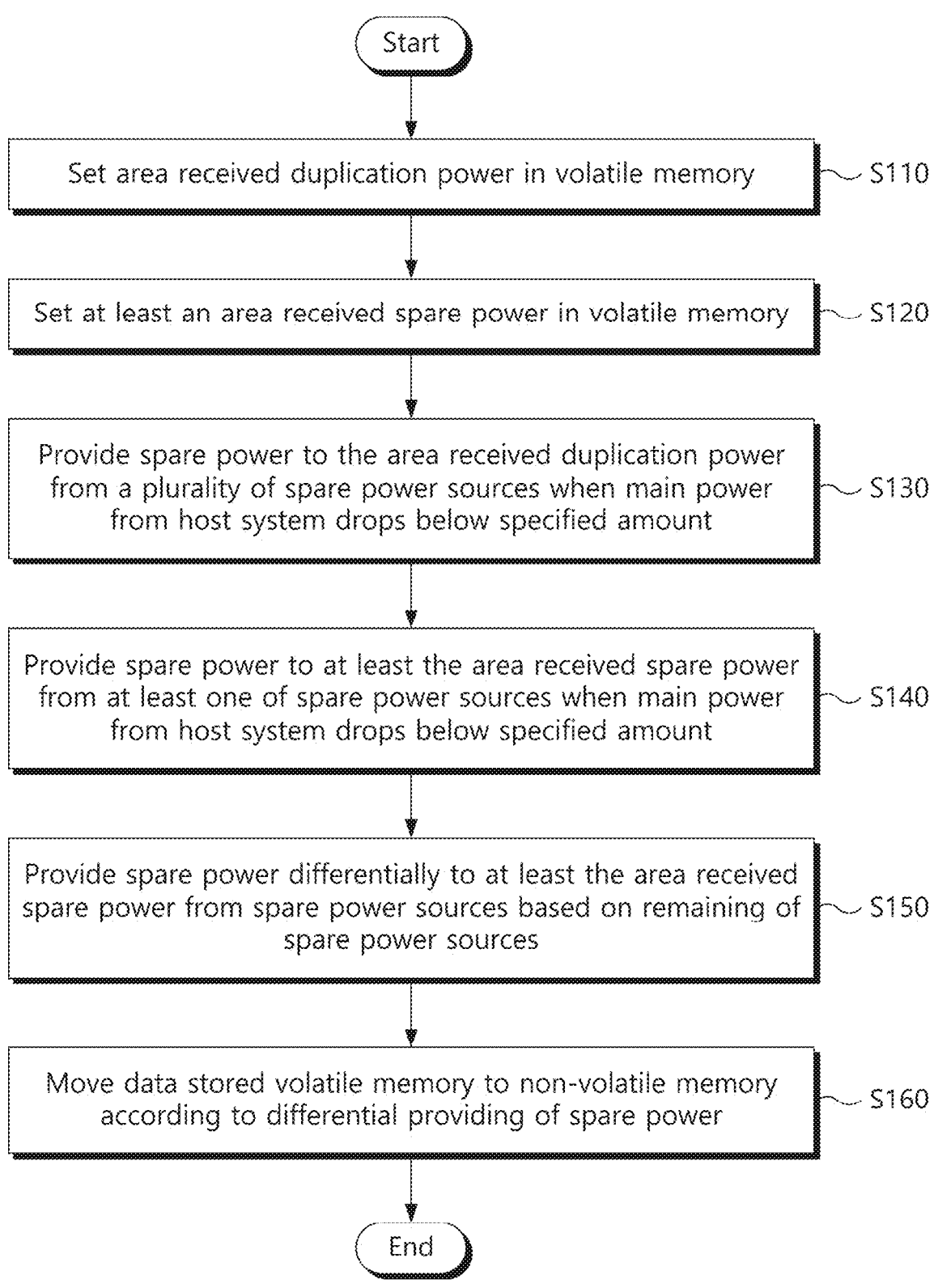

Start

Set area received duplication power in volatile memory — S110

Set at least an area received spare power in volatile memory — S120

Provide spare power to the area received duplication power from a plurality of spare power sources when main power from host system drops below specified amount — S130

Provide spare power to at least the area received spare power from at least one of spare power sources when main power from host system drops below specified amount — S140

Provide spare power differentially to at least the area received spare power from spare power sources based on remaining of spare power sources — S150

Move data stored volatile memory to non-volatile memory according to differential providing of spare power — S160

End

STORAGE DEVICE PREVENTING LOSS OF DATA IN SITUATION OF LACKING POWER AND OPERATING METHOD THEREOF

CROSS-REFERENCE TO RELATED APPLICATIONS

This application claims priority under 35 U.S.C. § 119 to Korean Patent Application No. 10-2022-0067029 filed on May 31, 2022, in the Korean Intellectual Property Office, and Korean Patent Application No. 10-2022-0102834 filed on Aug. 17, 2022, in the Korean Intellectual Property Office, the disclosures of which are incorporated by reference herein in their entireties.

BACKGROUND

Example embodiments of the present disclosure described herein relate to a storage device, and more particularly, relate to a storage device for preventing or reducing data loss in a situation of lacking power, and an operating method thereof.

Semiconductor memory devices are classified into a volatile semiconductor memory device and a non-volatile semiconductor memory device. The volatile semiconductor memory device is fast in read and write speeds but loses data stored therein when power is not supplied thereto. In contrast, the non-volatile semiconductor memory device retains data stored therein even when power is not supplied thereto. For this reason, the non-volatile semiconductor memory device is used to store information that needs to be retained regardless of whether power is supplied thereto.

A storage device may include a non-volatile memory device and a volatile memory device. The storage device may use the volatile memory device as a buffer memory that temporarily stores data to be stored in the non-volatile memory device. However, when sudden power shortage (e.g., sudden power off (SPO) or power glitch) occurs, data temporarily stored in the volatile memory device may be lost. In this case, the storage device may perform a data flushing operation of dumping data stored in the volatile memory device to the non-volatile memory device.

SUMMARY

Some example embodiments of the present disclosure provide a storage device that prevents or reduces the loss of important data stored in a volatile memory by redundantly supplying power to some areas of a volatile memory included in a storage device through a plurality of spare power sources when the sudden main power shortage (e.g., SPO or power glitch) of a host system occurs.

Some example embodiments of the present disclosure provide a storage device that divides a volatile memory into pieces of area-received-spare-power and then differentially adjusts pieces of area-received-spare-power, to which power is supplied, based on the remaining amount of power of a spare power source.

Some example embodiments of the present disclosure provide a storage device that backs up some data in a part of a volatile memory to a non-volatile memory device when the remaining amount of power of a spare power source drops to a specified amount or less.

Some example embodiments of the present disclosure provide a storage device that divides the volatile memory into pieces of area-received-spare-power and supplies power through different spare power sources for each area-received-spare-power.

According to an example embodiment, a storage device comprises a non-volatile memory configured to input or output data at a request of a host system; a volatile memory configured to temporarily store data input to or output from the non-volatile memory; an internal spare power source configured to supply power to a part of the volatile memory in response to main power supplied from the host system dropping to a first amount or less; and a storage controller configured to control data input or data output of the non-volatile memory and the volatile memory. Wherein the storage controller is configured to, in response to the main power dropping to the first amount or less, divide the volatile memory into area-received-duplication-power, in which higher priority data is stored, and at least one area-received-spare-power in which higher priority data is stored; redundantly supply spare power to the area-received-duplication-power from an external spare power source and the internal spare power source; and supply spare power to the at least one area-received-spare-power from the external spare power source.

According to an example embodiment, a storage device comprises a non-volatile memory configured to input or output data at a request of a host system; a volatile memory configured to temporarily store data input to or output from the non-volatile memory; and a storage controller configured to control data input or data output of the non-volatile memory and the volatile memory. Wherein the storage controller is configured to, in response to main power from the host system dropping to a first amount or less, supply spare power to the volatile memory through a spare power source; divide the volatile memory into pieces of area-received-spare-power; and differentially supply spare power to the pieces of area-received-spare-power based on a remaining amount of power of the spare power source.

According to an example embodiment, a storage device comprises a non-volatile memory configured to input or output data at a request of a host system; a volatile memory configured to temporarily store data input to or output from the non-volatile memory; an internal spare power source configured to supply power to a part of the volatile memory in response to main power from the host system dropping to a first amount or less; and a storage controller configured to control data input or data output of the non-volatile memory and the volatile memory. In response to the main power from the host system dropping to the first amount or less, the volatile memory includes area-received-duplication-power configured to redundantly receive spare power from the internal spare power source and at least two external spare power sources among a plurality of external spare power sources; and pieces of area-received-spare-power, each of which receives the spare power from at least one external spare power source among the plurality of external spare power sources.

BRIEF DESCRIPTION OF THE FIGURES

The above and other objects and features of the present disclosure will become apparent by describing in detail some example embodiments thereof with reference to the accompanying drawings.

FIG. 9 is a flowchart illustrating a method of setting area-received-spare-power in a volatile memory in a storage device, according to some example embodiments.

DETAILED DESCRIPTION

Hereinafter, some example embodiments of the present disclosure are described in detail and clearly to such an extent that a person having ordinary skill in the art may easily implement the present disclosure.

Figure 1:
FIG. 1 is a diagram illustrating a computing system, according to some example embodiments.
Figure 1:
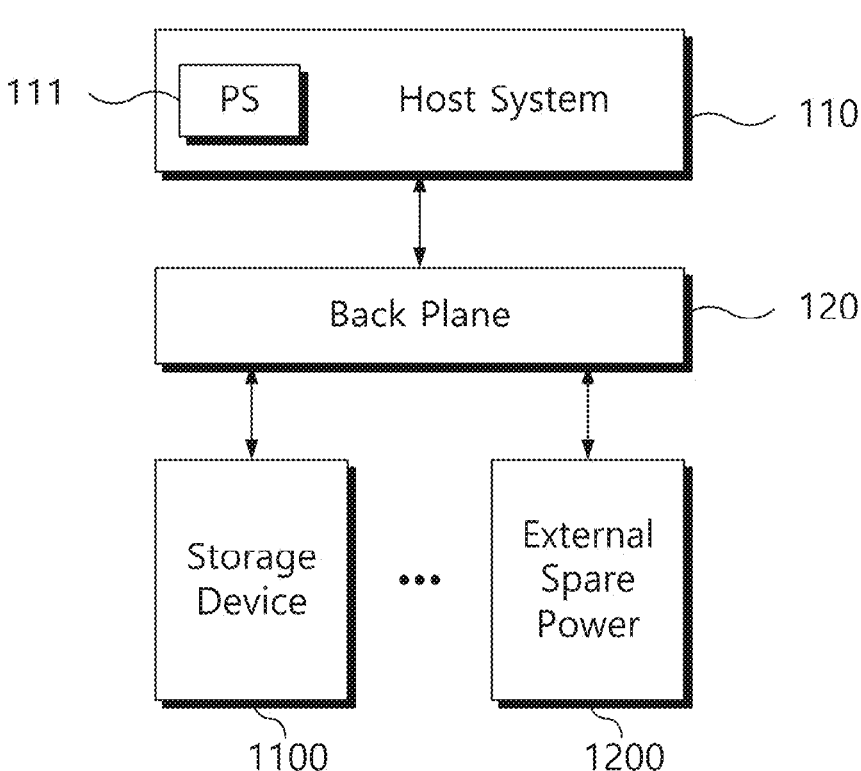

FIG. 1 is a diagram illustrating a computing system, according to some example embodiments. Referring to FIG. 1, a computing system 100 may include a host system 110, a back plane 120, at least one storage device 1100, and at least one external spare power 1200 (e.g., an external battery or a modular battery). For example, the computing system 100 may include a PC or a server system.

According to some example embodiments, the host system 110 may control the computing system 100 in totality. For example, the host system 110 may include components, which are necessary to control the computing system 100, such as a processor, a memory, and a power supply 111. The processor and the memory are mounted on a main board to be operated. The power supply 111 may supply power to the processor and the memory through the main board.

According to some example embodiments, the processor may control operations of the at least one storage device 1100 and the at least one external spare power 1200. For example, the processor may be at least one of a system-on-a-chip (SoC) such as an application processor (AP) for controlling the storage device 1100, a central processing unit (CPU), a digital signal processor (DSP), and a graphics processing unit (GPU).

According to some example embodiments, to control the operations of the at least one storage device 1100 and the at least one external spare power 1200, the memory may store various software or firmware. For example, the memory may be a volatile memory device such as a dynamic random access memory (DRAM), a synchronous dynamic random access memory (SDRAM), a double data rate (DDR) DRAM, a DDR SDRAM, a low power double data rate (LPDDR) SDRAM, a graphics double data rate (GDDR) SDRAM, a rambus dynamic random access memory (RDRAM), a static random access memory (SRAM), or the like.

According to some example embodiments, the power supply 111 may supply power to the at least one storage device 1100 and the at least one external spare power 1200 through the back plane 120. For example, the power supply 111 may provide main power to the at least one storage device 1100. The power supply 111 may charge the at least one external spare power 1200.

According to some example embodiments, the back plane 120 may connect the host system 110, the at least one storage device 1100, and the at least one external spare power 1200. For example, each of (or alternatively, at least one of) the at least one storage device 1100 and the at least one external spare power 1200 may be configured in a form of a module connected to a socket or slot, which is provided in the back plane 120. The back plane 120 may include a switching block for interfacing between the at least one storage device 1100 and the host system 110.

According to some example embodiments, the storage device 1100 may store data received from the host system 110. The storage device 1100 may transmit stored data at the request of the host system 110. For example, the storage device 1100 and the host system 110 may be connected to each other through a host interface. The host interface may include a standard interface such as an advanced technology attachment (ATA) interface, a serial ATA (SATA) interface, a parallel ATA (PATA) interface, a small computer system interface (SCSI), an enhanced small disk interface (ESDI), IEEE 1394, an integrated drive electronics (IDE) interface, a card interface, or a compute express link (CXL). The storage device 1100 may be a data storage device based on a flash memory. For example, the storage device 1100 may include a solid state drive (SSD), a universal flash storage (UFS), and a memory card.

According to some example embodiments, when main power from the power supply 111 of the host system 110 drops to a specified or desired amount or less (or when the main power is shut off), the external spare power 1200 may supply power to the storage device 1100. For example, the external spare power 1200 may include a rechargeable battery. The external spare power 1200 may be charged by receiving power from the power supply 111 of the host system 110. The external spare power 1200 may charge an internal spare power source (e.g., a capacitor or a battery) of the storage device 1100.

Figure 2:
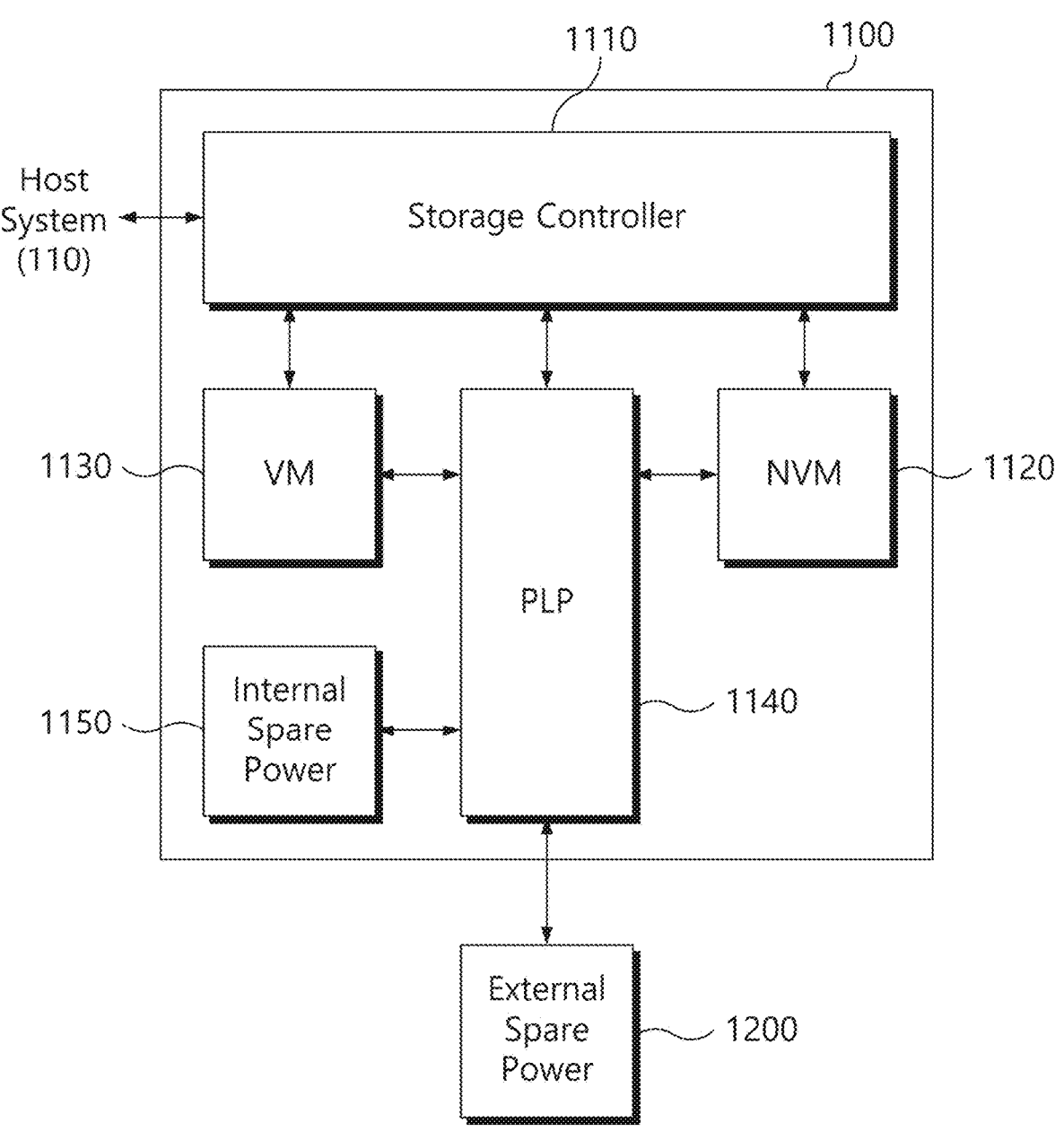
FIG. 2 is a diagram illustrating the storage device of FIG. 1.

FIG. 2 is a diagram illustrating the storage device of FIG. 1. Referring to FIG. 2, the storage device 1100 may include a storage controller 1110, a non-volatile memory 1120, a volatile memory 1130, a power loss protection circuit 1140, and an internal spare power 1150.

According to some example embodiments, the storage controller 1110 may be configured to control the non-volatile memory 1120. For example, at the request of a host system 100, the storage controller 1110 may write data to the non-volatile memory 1120 or may read out data stored in the non-volatile memory 1120. To access the non-volatile memory 1120, the storage controller 1110 may provide a command, an address, data, and a control signal to the non-volatile memory 1120.

According to some example embodiments, the storage controller 1110 may perform an access operation of writing data to the volatile memory 1130 or reading out data stored in the volatile memory 1130. For example, the storage controller 1110 may provide the volatile memory 1130 with a command, an address, data, and a control signal for writing data to the volatile memory 1130 or reading out data stored in the volatile memory 1130. The storage controller 1110 may temporarily store data, which is received from the host system 110 or the non-volatile memory 1120, in the volatile memory 1130.

According to some example embodiments, under the control of the storage controller 1110, the non-volatile memory 1120 may input or output data. For example, the non-volatile memory 1120 may be an NAND flash memory, an NOR flash memory, a ferroelectric random access memory (FRAMs), a phase change RAM (PRAM), a thyristor RAM (TRAM), a magnetic RAM (MRAM), or the like.

According to some example embodiments, the volatile memory 1130 may be used as a working memory, a cache memory, or a buffer memory of the storage controller 1110. The volatile memory 1130 may be used as a cache memory of the non-volatile memory 1120. The volatile memory 1130 may store codes or instructions that the storage controller 1110 executes. The volatile memory 1130 may store data processed by the storage controller 1110. For example, the volatile memory 1130 may be a volatile memory device such as a DRAM, an SDRAM, a DDR DRAM, a DDR SDRAM, an LPDDR SDRAM, a GDDR SDRAM, an RDRAM, an SRAM, or the like. In the present specification, the present disclosure has been described based on a DRAM, but the technical spirit of the present disclosure is not limited thereto.

According to some example embodiments, the power loss protection circuit 1140 may manage a power supply within the storage device 1100. For example, the power loss protection circuit 1140 may supply main power supplied from the power supply 111 of the host system 110 to the storage controller 1110, the non-volatile memory 1120, or the volatile memory 1130. The power loss protection circuit 1140 may supply the main power supplied from the power supply 111 of the host system 110 to the internal spare power 1150. The power loss protection circuit 1140 may supply power supplied from the external spare power 1200 to the internal spare power 1150.

According to some example embodiments, when the main power of the host system 110 is insufficient (e.g., SPO or power glitch) (or when the main power drops to a specified or desired amount or less), the power loss protection circuit 1140 may notify the storage controller 1110 that the main power of the host system 110 is insufficient. For example, when the main power from the power supply 111 of the host system 110 drops to the specified or desired amount or less, the power loss protection circuit 1140 may supply spare power from the internal spare power 1150 or the external spare power 1200 to the storage controller 1110, the non-volatile memory 1120, or the volatile memory 1130. When the main power drops to the specified or desired amount or less, the power loss protection circuit 1140 may supply power to only a specified or desired portion of the volatile memory 1130. For example, the power loss protection circuit 1140 may be implemented as a circuit separate from the storage controller 1110. As another example, the power loss protection circuit 1140 may be implemented to be included in the storage controller 1110.

According to some example embodiments, the power loss protection circuit 1140 may manage a power supply path of the internal spare power 1150 or the external spare power 1200. For example, the power loss protection circuit 1140 may manage a power supply path from the internal spare power 1150 to the storage controller 1110, the non-volatile memory 1120, or the volatile memory 1130. The power loss protection circuit 1140 may manage a power supply path from the external spare power 1200 to the storage controller 1110, the non-volatile memory 1120, the volatile memory 1130, or the internal spare power 1150.

According to some example embodiments, when the main power of the host system 110 is insufficient (e.g., SPO or power glitch) (or when the main power drops to a specified or desired amount or less), the internal spare power 1150 may supply power to the storage controller 1110, the non-volatile memory 1120, or the volatile memory 1130 through the power loss protection circuit 1140. The internal spare power 1150 may be charged by receiving power from the power supply 111 of the host system 110 or the external spare power 1200. For example, the internal spare power 1150 may include a capacitor, a super capacitor, or a rechargeable battery.

According to some example embodiments, the storage controller 1110 may divide the volatile memory 1130 into a plurality of power supply areas and may manage a power supply for each power supply area. For example, the storage controller 1110 may allow the power loss protection circuit 1140 to supply power to the volatile memory 1130 for each power supply area. The storage controller 1110 may set an area, which redundantly receives power from the internal spare power 1150 and the external spare power 1200 in a portion of the volatile memory 1130. The storage controller 1110 may set a plurality of areas, which receives power, based on the remaining amount of power of the external spare power 1200.

Figure 3:
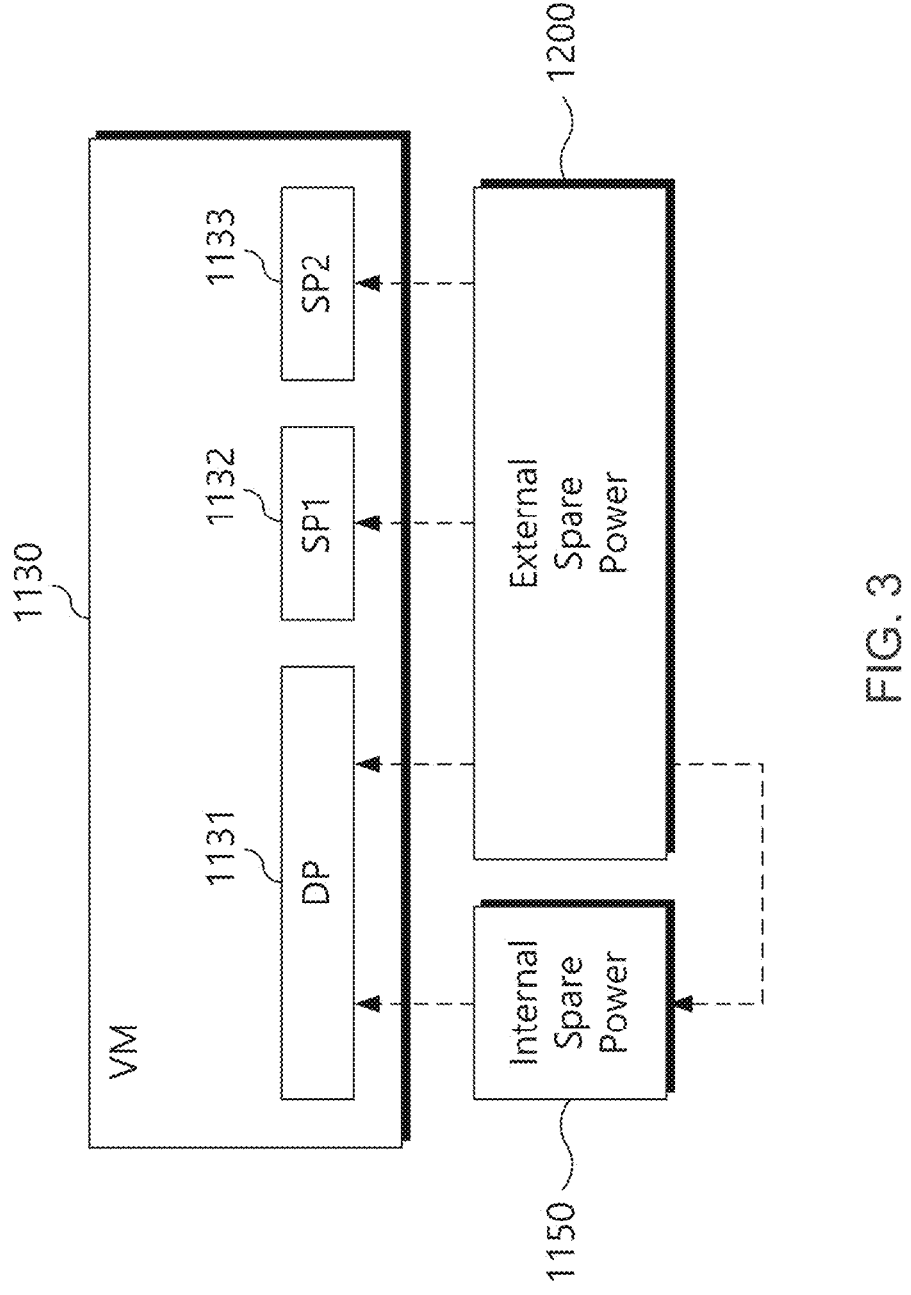
FIG. 3 is a diagram illustrating a method of supplying spare power to the volatile memory of FIG. 2.

FIG. 3 is a diagram illustrating a method of supplying spare power to the volatile memory of FIG. 2. Referring to FIGS. 2 and 3, when the sudden main power shortage (e.g., SPO or power glitch) of a host system occurs (or when the main power drops to a specified or desired amount or less), the volatile memory 1130 may receive spare power through the internal spare power 1150 or the external spare power 1200. The storage controller 1110 may divide the volatile memory 1130 into an area-received-duplication-power 1131 (e.g., iron space) (i.e., the area-received-duplication-power 1131 refers to an area for receiving duplication power), a first area-received-spare-power 1132 (i.e., the first area-received-spare-power 1132 refers to a first area for receiving spare power), and a second area-received-spare-power 1133 (i.e., the second area-received-spare-power 1133 refers to a second area for receiving spare power) to supply the spare power. Under the control of the storage controller 1110, the power loss protection circuit 1140 may provide a power supply path to the area-received-duplication-power 1131, the first area-received-spare-power 1132, and the second area-received-spare-power 1133.

According to some example embodiments, when the sudden main power shortage (e.g., SPO or power glitch) of a host system occurs (or when the main power drops to a specified or desired amount or less), the area-received-duplication-power 1131 may redundantly receive spare power through the internal spare power 1150 or the external spare power 1200. For example, the area-received-duplication-power 1131 may receive the spare power through the internal spare power 1150 and the external spare power 1200 at the same time. As another example, the area-received-duplication-power 1131 may receive the spare power from the internal spare power 1150 primarily. When the internal spare power 1150 is depleted, the area-received-duplication-power 1131 may receive the spare power from the external spare power 1200 secondarily. As still another example, the area-received-duplication-power 1131 may receive power from the internal spare power 1150. The external spare power 1200 may charge the internal spare power 1150 such that the remaining amount of power of the internal spare power 1150 is maintained at the specified or desired capacity (e.g., 50%) or more.

As such, when the main power of the host system 110 is insufficient (e.g., SPO or power glitch) (or when the main power drops to a specified or desired amount or less), a power supply in the area-received-duplication-power 1131 may be maintained as long as the internal spare power 1150 and the external spare power 1200 are maintained, and data stored in the area-received-duplication-power 1131 may be protected. Accordingly, while the main power of the host system 110 is insufficient or the main power is shut off (or when the main power drops to a specified or desired amount or less), important data (e.g., higher priority data such as meta data or encrypted data) stored in the area-received-duplication-power 1131 may be protected.

According to some example embodiments, the storage controller 1110 may determine a size of the area-received-duplication-power 1131. For example, the storage controller 1110 may set the size of the area-received-duplication-power 1131 to a predetermined or desired size in advance. The storage controller 1110 may adjust the size of the area-received-duplication-power 1131 based on the remaining amount of power of each of (or alternatively, at least one of) the internal spare power 1150 and the external spare power 1200. The storage controller 1110 may receive remaining amount of power information of each of (or alternatively, at least one of) the internal spare power 1150 and the external spare power 1200 from the power loss protection circuit 1140.

According to some example embodiments, the storage controller 1110 may set the area-received-duplication-power 1131 in one physical memory chip included in the volatile memory 1130. Alternatively, the storage controller 1110 may set the area-received-duplication-power 1131 across at least two or more physical memory chips included in the volatile memory 1130.

According to some example embodiments, the storage controller 1110 may set the first area-received-spare-power 1132 and the second area-received-spare-power 1133 based on the remaining amount of power of the external spare power 1200. For example, when the remaining amount of the external spare power 1200 is greater than a first remaining amount of power (e.g., 90%), the storage controller 1110 may supply power to both the first area-received-spare-power 1132 and the second area-received-spare-power 1133. When the remaining amount of power of the external spare power 1200 is not greater than a second remaining amount of power (e.g., 60%) less than the first remaining amount of power, the storage controller 1110 may shut off a power supply of the second area-received-spare-power 1133 and may supply power only to the first area-received-spare-power 1132. When the remaining amount of power of the external spare power 1200 is not greater than a third remaining amount of power (e.g., 30%) less than the second remaining amount of power, the storage controller 1110 may shut off the power supply of the first area-received-spare-power 1132 and may supply power only to the area-received-duplication-power 1131. However, this is an example. For example, the volatile memory 1130 may be divided into at least one or more power areas. Moreover, the area-received-duplication-power 1131 may be set to be included in the first area-received-spare-power 1132 or may be set separately from the first area-received-spare-power 1132.

According to some example embodiments, the area-received-duplication-power 1131, the first area-received-spare-power 1132, and the second area-received-spare-power 1133 may be set based on a logical division (e.g., a logical address). Alternatively, the area-received-duplication-power 1131, the first area-received-spare-power 1132, and the second area-received-spare-power 1133 may be set based on a physical division (e.g., a physical address, a memory bank, a memory chip, or a memory module).

According to some example embodiments, the storage controller 1110 may back up data in a power area, in which a spare power supply is shut off, to the non-volatile memory 1120. For example, when the external spare power 1200 is not greater than the second remaining amount of power (e.g., 60%), the storage controller 1110 may move data stored in the second area-received-spare-power 1133 to the non-volatile memory 1120 and may shut off the power supply of the second area-received-spare-power 1133. When the external spare power 1200 is not greater than the third remaining amount of power (e.g., 30%), the storage controller 1110 may move the data stored in the first area-received-spare-power 1132 to the non-volatile memory 1120 and may shut off the power supply of the first area-received-spare-power 1132.

According to some example embodiments, when the main power of the host system 110 is insufficient or is shut off (e.g., SPO) (or when the main power drops to a specified or desired amount or less), the storage controller 1110 may determine to supply spare power of the first area-received-spare-power 1132 and the second area-received-spare-power 1133. For example, when the external spare power 1200 is not greater than the second remaining amount of power (e.g., 60%) while the main power of the host system 110 is insufficient or is shut off (e.g., SPO) (or when the main power drops to a specified or desired amount or less), the storage controller 1110 may back up data stored in the second area-received-spare-power 1133 to the non-volatile memory 1120 and may shut off the power supply of the second area-received-spare-power 1133. When the external spare power 1200 is not greater than the third remaining amount of power (e.g., 30%) while the main power of the host system 110 is insufficient or is shut off (e.g., SPO) (or when the main power drops to a specified or desired amount or less), the storage controller 1110 may back up data stored in the first area-received-spare-power 1132 to the non-volatile memory 1120 and may shut off the power supply of the first area-received-spare-power 1132.

According to some example embodiments, when the main power of the host system 110 is insufficient (e.g., SPO or power glitch) (or when the main power drops to a specified or desired amount or less), the storage controller 1110 may divide and manage the volatile memory 1130 into pieces of area-received-spare-power to maintain the data stored in the volatile memory 1130 as long as possible. For example, the storage controller 1110 may classify the volatile memory 1130 into the area-received-duplication-power 1131 and at least one area-received-spare-power (e.g., the first area-received-spare-power 1132 or the second area-received-spare-power 1133). On the basis of the remaining amount of power of a spare power source (e.g., the internal spare power 1150 or the external spare power 1200), the storage controller 1110 may differentially supply spare power to the area-received-duplication-power 1131 and the at least one area-received-spare-power such that the spare power source is maintained as long as possible.

According to some example embodiments, when the main power of the host system 110 is insufficient (e.g., SPO or power glitch) (or when the main power drops to a specified or desired amount or less), the storage controller 1110 may divide and manage the volatile memory 1130 into pieces of area-received-spare-power based on the importance of the data stored in the volatile memory 1130. For example, the storage controller 1110 may store important data (e.g., meta data or encrypted data) (or the highest priority data) in the area-received-duplication-power 1131. The storage controller 1110 may store general data (e.g., lower priority data such as data capable of being recovered through the host system 110 or the non-volatile memory 1120) (or next-order data) in the at least one area-received-spare-power (e.g., the first area-received-spare-power 1132 or the second area-received-spare-power 1133). The storage controller 1110 may differentially shut off spare power from the at least one area-received-spare-power and may redundantly supply the spare power to the area-received-duplication-power 1131, thereby preventing or reducing the loss of important data as long as possible. Because the area-received-duplication-power 1131 redundantly receives spare power through the internal spare power 1150 or the external spare power 1200, the important data stored in the area-received-duplication-power 1131 may be doubly protected.

According to some example embodiments, the storage controller 1110 may set the size of the area-received-duplication-power 1131 in advance and may adjust the size of the area-received-duplication-power 1131 based on the size of important data. For example, the storage controller 1110 may monitor the size of important data (e.g., meta data or encrypted data) in real time. The storage controller 1110 may increase or decrease the size of the area-received-duplication-power 1131 in real time depending on an increase or decrease in the size of important data. When the main power of the host system 110 is insufficient (e.g., SPO or power glitch) (or when the main power drops to a specified or desired amount or less), the storage controller 1110 may adjust an allocation ratio of a spare power source (e.g., the internal spare power 1150 or the external spare power 1200) to the area-received-duplication-power 1131 and at least one area-received-spare-power based on the size of the area-received-duplication-power 1131.

Figure 4:
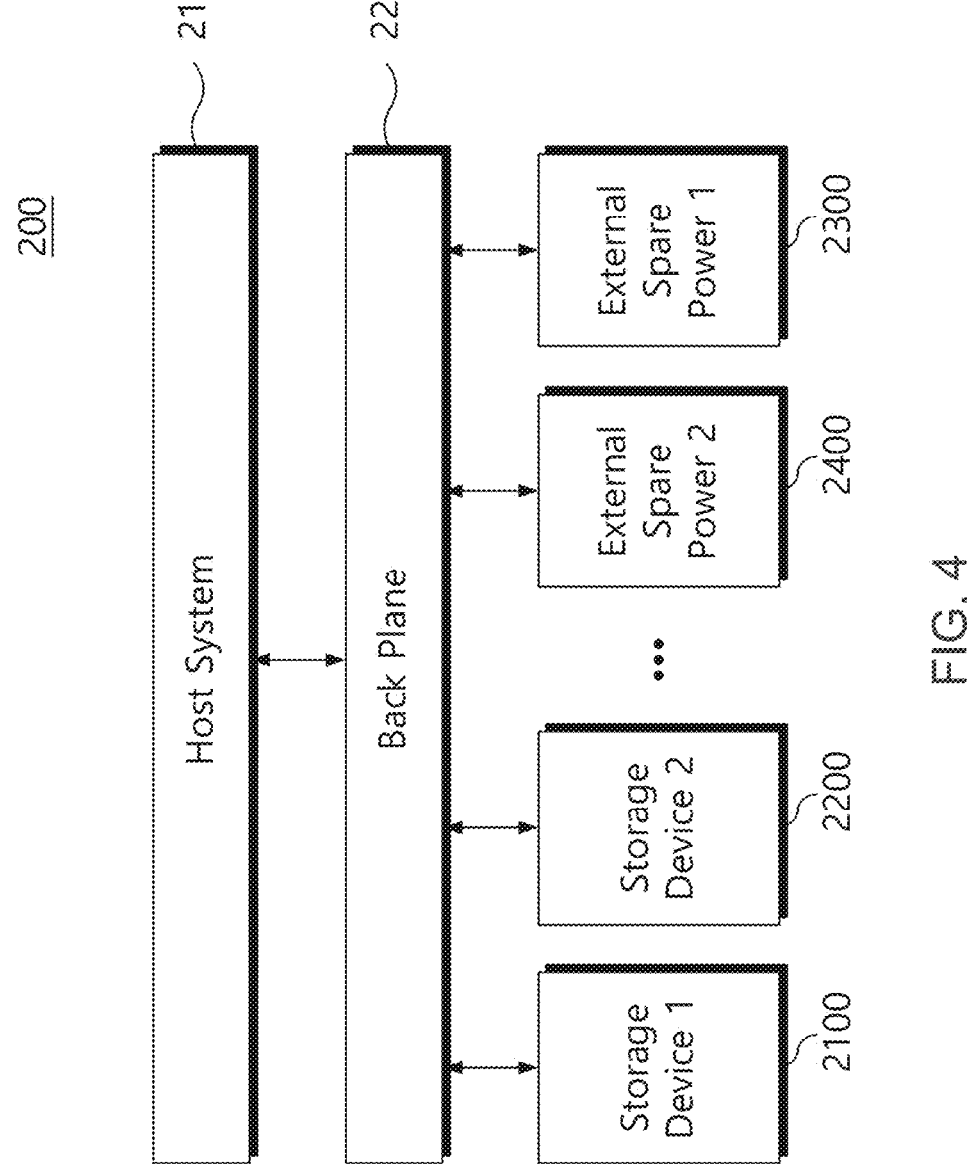
FIG. 4 is a diagram illustrating a computing system, according to various example embodiments.

FIG. 4 is a diagram illustrating a computing system, according to various example embodiments. Referring to FIG. 4, a computing system 200 may include a host system 210, a back plane 220, a plurality of storage devices (e.g., a first storage device 2100 and a second storage device 2200), and a plurality of external spare power sources (e.g., an external spare power 1 2300 and an external spare power 2 2400). For example, the computing system 200 may include a PC or a server system.

According to some example embodiments, characteristics and operations of the host system 210 and the back plane 220 may be the same as or similar to those of the host system 110 and the back plane 120 of FIG. 1. As such, descriptions of characteristics and operations the same as or similar to those of the host system 110 and the back plane 120 of FIG. 1 will be omitted to avoid redundancy.

According to some example embodiments, the first storage device 2100 and the second storage device 2200 may have the same standard. Alternatively, the first storage device 2100 and the second storage device 2200 may have different standards. For example, the first storage device 2100 may be a general SSD, and the second storage device 2200 may be a high-performance SSD (e.g., CXL-SSD).

According to some example embodiments, the first external spare power 2300 and the second external spare power 2400 may have the same capacity as each other. Alternatively, the first external spare power 2300 and the second external spare power 2400 may have different capacities from each other.

Figure 5:
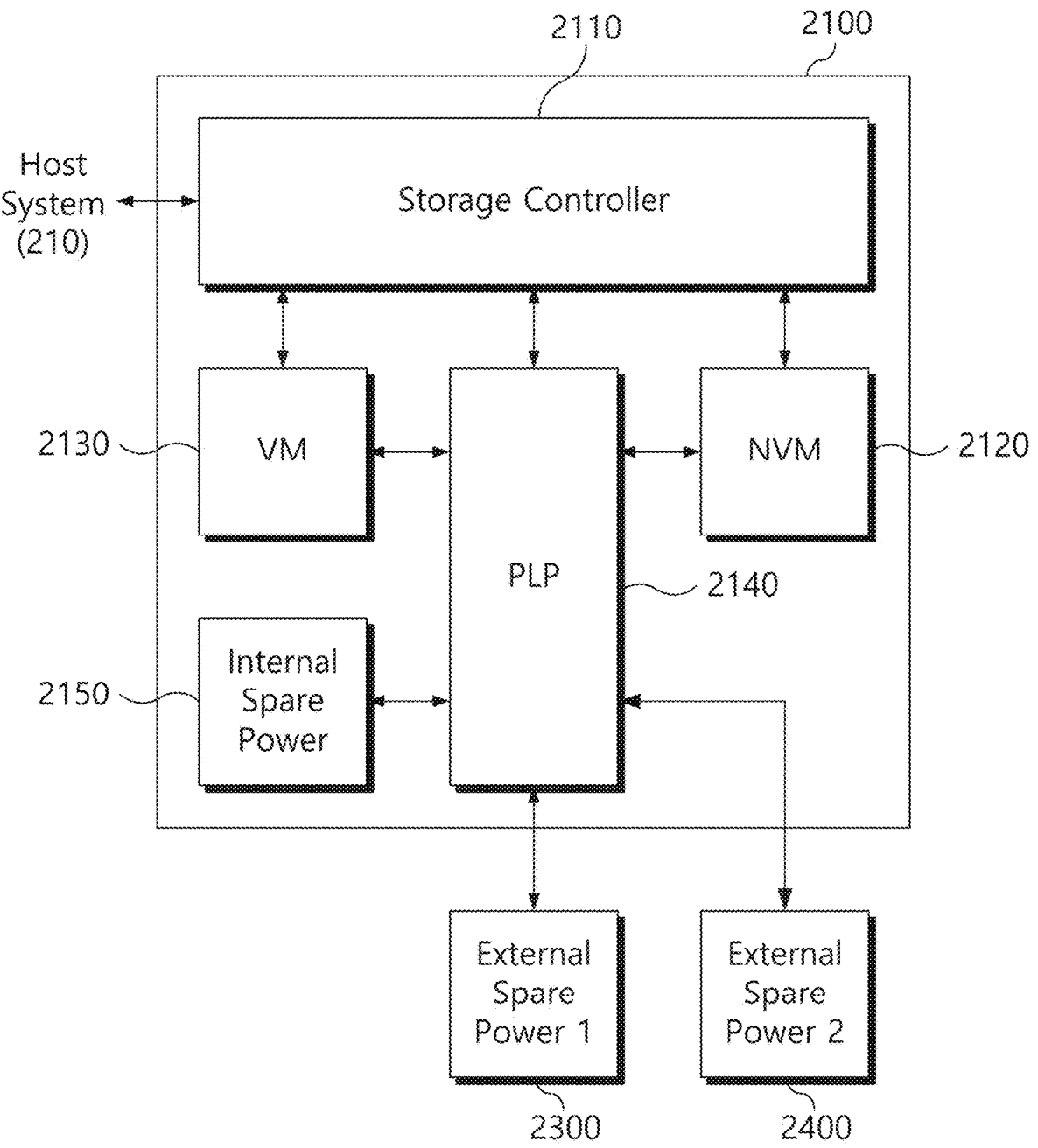
FIG. 5 is a diagram illustrating the first storage device of FIG. 4.

FIG. 5 is a diagram illustrating the first storage device of FIG. 4. Referring to FIG. 5, the first storage device 2100 may include a storage controller 2110, a non-volatile memory 2120, a volatile memory 2130, a power loss protection circuit 2140, and an internal spare power 2150.

According to some example embodiments, configurations and characteristics of the first storage device 2100 may be the same as or similar to those of the storage device 1100 of FIG. 2. Accordingly, the configurations and characteristics of the first storage device 2100 that are the same as or similar to the storage device 1100 of FIG. 2 will be omitted to avoid redundancy.

According to some example embodiments, the power loss protection circuit 2140 may manage a power supply within the first storage device 2100. For example, the power loss protection circuit 2140 may supply power to the storage controller 2110, the non-volatile memory 2120, or the volatile memory 2130. The power loss protection circuit 2140 may supply main power supplied from a power supply of the host system 210 to the internal spare power 2150. The power loss protection circuit 2140 may supply spare power supplied from the first external spare power 2300 or the second external spare power 2400 to the internal spare power 2150.

According to some example embodiments, the power loss protection circuit 2140 may manage a power supply path of the internal spare power 2150, the first external spare power 2300, or the second external spare power 2400. For example, the power loss protection circuit 2140 may manage a spare power supply path from the internal spare power 2150 to the storage controller 2110, the non-volatile memory 2120, or the volatile memory 2130. The power loss protection circuit 2140 may manage a spare power supply path from the first external spare power 2300 to the storage controller 2110, the non-volatile memory 2120, the volatile memory 2130, or the internal spare power 2150. The power loss protection circuit 2140 may manage a spare power supply path from the second external spare power 2400 to the storage controller 2110, the non-volatile memory 2120, the volatile memory 2130, or the internal spare power 2150.

According to some example embodiments, the internal spare power 2150 may supply spare power to the storage controller 2110, the non-volatile memory 2120, or the volatile memory 2130 through the power loss protection circuit 2140. The internal spare power 2150 may be charged by receiving power from the power supply of the host system 210, the first external spare power 2300, or the second external spare power 2400. For example, the internal spare power 2150 may include a capacitor, a super capacitor, or a rechargeable battery.

According to some example embodiments, the storage controller 2110 may divide the volatile memory 2130 into a plurality of power supply areas and may manage a spare power supply for each power supply area. For example, the storage controller 2110 may allow the power loss protection circuit 2140 to supply spare power to the volatile memory 2130 for each power supply area. The storage controller 2110 may set an area, which redundantly receives spare power from the internal spare power 2150, the first external spare power 2300, or the second external spare power 2400, for a part of the volatile memory 2130. The storage controller 2110 may set a plurality of power supply areas, each of (or alternatively, at least one of) which receives spare power, based on the remaining amount of power of the first external spare power 2300 or the second external spare power 2400.

Figure 6:
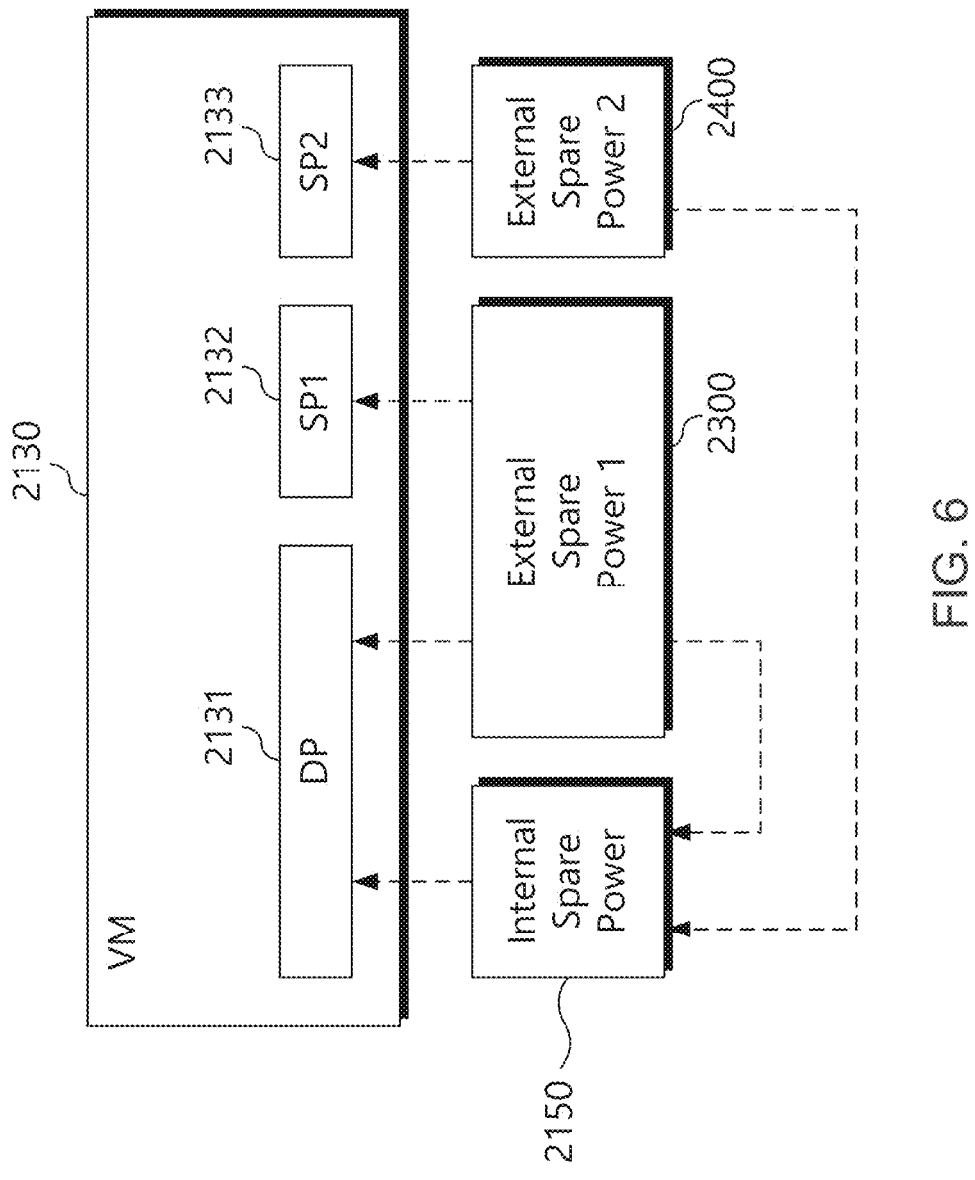
FIG. 6 is a diagram illustrating an example of a power supplying method of the volatile memory of FIG. 5.

FIG. 6 is a diagram illustrating an example of a power supplying method of the volatile memory of FIG. 5. Referring to FIGS. 5 and 6, when the main power of the host system 110 is insufficient (e.g., SPO or power glitch) (or when the main power drops to a specified or desired amount or less), the volatile memory 2130 may receive spare power through the internal spare power 2150 or a plurality of external spare power sources (e.g., the first external spare power 2300 and the second external spare power 2400). The storage controller 2110 may divide the volatile memory 2130 into an area-received-duplication-power 2131 (e.g., iron space), a first area-received-spare-power 2132 and a second area-received-spare-power 2133 to the supply spare power. Under the control of the storage controller 2110, the power loss protection circuit 2140 may provide a spare power supply path to the area-received-duplication-power 2131, the first area-received-spare-power 2132, and the second area-received-spare-power 2133. The area-received-duplication-power 2131, the first area-received-spare-power 2132, and the second area-received-spare-power 2133 may have configurations and characteristics the same as or similar to those of the area-received-duplication-power 1131, the first area-received-spare-power 1132, and the second area-received-spare-power 1133 of FIG. 3. Hereinafter, descriptions of configurations and characteristics the same as or similar to those of the area-received-duplication-power 1131, the first area-received-spare-power 1132, and the second area-received-spare-power 1133 of FIG. 3 will be omitted to avoid redundancy.

According to some example embodiments, the area-received-duplication-power 2131 may redundantly receive spare power through the internal spare power 2150 or the first external spare power 2300. For example, the area-received-duplication-power 2131 may receive spare power through the internal spare power 2150 and the first external spare power 2300 at the same time. As another example, the area-received-duplication-power 2131 may receive the spare power from the internal spare power 2150 primarily. When the internal spare power 2150 is depleted, the area-received-duplication-power 1131 may receive the spare power from the first external spare power 2300 secondarily. As still another example, the area-received-duplication-power 2131 may receive spare power from the internal spare power 2150. The first external spare power 2300 or the second external spare power 2400 may charge the internal spare power 2150 such that the remaining amount of power of the internal spare power 2150 is maintained at the specified or desired capacity (e.g., 50%) or more.

As such, when the main power of the host system 210 is insufficient or is shut off (e.g., SPO) (or when the main power drops to a specified or desired amount or less), a power supply in the area-received-duplication-power 2131 may be maintained as long as the internal spare power 2150, the first external spare power 2300, or the second external spare power 2400 are maintained, and data stored in the area-received-duplication-power 2131 may be protected. Accordingly, while the main power of the host system 210 is insufficient or the main power is shut off (or when the main power drops to a specified or desired amount or less), important data (e.g., meta data or encrypted data) stored in the area-received-duplication-power 2131 may be protected.

According to some example embodiments, the storage controller 2110 may determine a size of the area-received-duplication-power 2131. For example, the storage controller 2110 may set the size of the area-received-duplication-power 2131 to a predetermined or desired size. The storage controller 2110 may adjust the size of the area-received-duplication-power 2131 based on the remaining amount of power of each of (or alternatively, at least one of) the internal spare power 2150 and the first external spare power 2300. The storage controller 2110 may receive remaining amount of power information of each of (or alternatively, at least one of) the internal spare power 2150 and the first external spare power 2300 from the power loss protection circuit 2140.

According to some example embodiments, the storage controller 2110 may supply power to the first area-received-spare-power 2132 and the second area-received-spare-power 2133 through different spare power sources. For example, the first area-received-spare-power 2132 may receive spare power from the first external spare power 2300. The second area-received-spare-power 2133 may receive spare power from the second external spare power 2400. When the remaining amount of power of the first external spare power 2300 drops to a specified or desired amount (e.g., 50%) or less, the storage controller 2110 may back up data stored in the first area-received-spare-power 2132 to the non-volatile memory 2120 and may shut off a power supply of the first area-received-spare-power 2132. When the remaining amount of power of the second external spare power 2400 drops to a specified or desired amount (e.g., 50%) or less, the storage controller 2110 may back up data stored in the second area-received-spare-power 2133 to the non-volatile memory 2120 and may shut off a power supply of the second area-received-spare-power 2133. When the first area-received-spare-power 2132 or the second area-received-spare-power 2133 is powered off, the first external spare power 2300 or the second external spare power 2400 may be configured to charge an internal spare power source.

Figure 7:
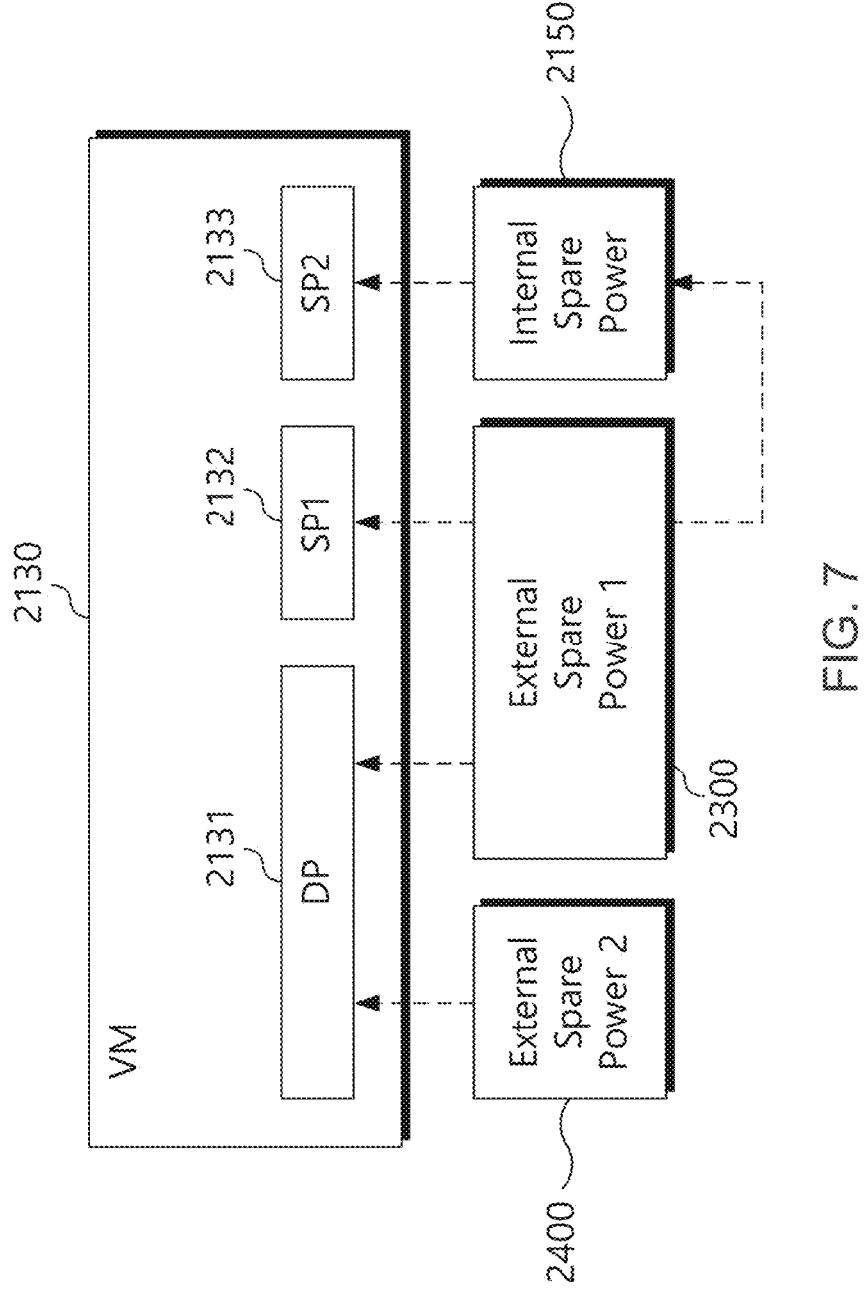
FIG. 7 is a diagram illustrating another example of a spare power supplying method of the volatile memory of FIG. 5.

FIG. 7 is a diagram illustrating another example of a spare power supplying method of the volatile memory of FIG. 5. Referring to FIGS. 5 and 7, the volatile memory 2130 may receive spare power through the internal spare power 2150 or a plurality of external spare power sources (e.g., the first external spare power 2300 and the second external spare power 2400). The storage controller 2110 may divide the volatile memory 2130 into an area-received-duplication-power 2131 (e.g., iron space), a first area-received-spare-power 2132 and a second area-received-spare-power 2133 to the supply spare power. Under the control of the storage controller 2110, the power loss protection circuit 2140 may provide a spare power supply path to the area-received-duplication-power 2131, the first area-received-spare-power 2132, and the second area-received-spare-power 2133. The area-received-duplication-power 2131, the first area-received-spare-power 2132, and the second area-received-spare-power 2133 may have configurations and characteristics the same as or similar to those of the area-received-duplication-power 1131, the first area-received-spare-power 1132, and the second area-received-spare-power 1133 of FIG. 3. Hereinafter, descriptions of configurations and characteristics the same as or similar to those of the area-received-duplication-power 1131, the first area-received-spare-power 1132, and the second area-received-spare-power 1133 of FIG. 3 will be omitted to avoid redundancy.

According to some example embodiments, the area-received-duplication-power 2131 may redundantly receive spare power through the first external spare power 2300 and the second external spare power 2400. For example, the area-received-duplication-power 2131 may receive the spare power through the first external spare power 2300 and the second external spare power 2400 at the same time. As another example, the area-received-duplication-power 2131 may receive the spare power from the first external spare power 2300 primarily. When the first external spare power 2300 is depleted, the area-received-duplication-power 1131 may receive the spare power from the second external spare power 2400 secondarily. As another example, the area-received-duplication-power 2131 may receive the spare power from the second external spare power 2400 primarily. When the second external spare power 2400 is depleted, the area-received-duplication-power 1131 may receive the spare power from the first external spare power 2300 secondarily.

As such, when the main power of the host system 210 is insufficient or is shut off (e.g., SPO) (or when the main power drops to a specified or desired amount or less), a power supply in the area-received-duplication-power 2131 may be maintained as long as the first external spare power 2300, or the second external spare power 2400 are maintained, and data stored in the area-received-duplication-power 2131 may be protected. Accordingly, while the main power of the host system 210 is insufficient or the main power is shut off (or when the main power drops to a specified or desired amount or less), important data (e.g., meta data or encrypted data) stored in the area-received-duplication-power 2131 may be protected.

According to some example embodiments, the storage controller 2110 may determine a size of the area-received-duplication-power 2131. For example, the storage controller 2110 may set the size of the area-received-duplication-power 2131 to a predetermined or desired size in advance. The storage controller 2110 may adjust the size of the area-received-duplication-power 2131 based on the remaining amount of power of each of (or alternatively, at least one of) the first external spare power 2300 and the second external spare power 2400. The storage controller 2110 may receive remaining amount of power information of each of (or alternatively, at least one of) the first external spare power 2300 and the second external spare power 2400 from the power loss protection circuit 2140.

According to some example embodiments, the storage controller 2110 may supply spare power to the first area-received-spare-power 2132 and the second area-received-spare-power 2133 through different spare power sources. For example, the first area-received-spare-power 2132 may receive spare power from the first external spare power 2300. The second area-received-spare-power 2133 may receive spare power from the internal spare power 2150. When the remaining amount of power of the first external spare power 2300 drops to a specified or desired amount (e.g., 50%) or less, the storage controller 2110 may back up data stored in the first area-received-spare-power 2132 to the non-volatile memory 2120 and may shut off a power supply of the first area-received-spare-power 2132.

According to some example embodiments, the storage controller 2110 may be configured to charge the internal spare power 2150 by the first external spare power 2300. When the remaining amount of power of the first external spare power 2300 drops to a specified or desired amount (e.g., 50%) or less, the storage controller 2110 may stop charging the internal spare power 2150 by the first external spare power 2300. For example, when the charging of the internal spare power 2150 is interrupted, the storage controller 2110 may back up data stored in the second area-received-spare-power 2133 to the non-volatile memory 2120 and may shut off the power supply of the second area-received-spare-power 2133. When the power supply to the second area-received-spare-power 2133 is shut off, the storage controller 2110 may supply the spare power of the internal spare power 2150 to the area-received-duplication-power 2131.

Figure 8:
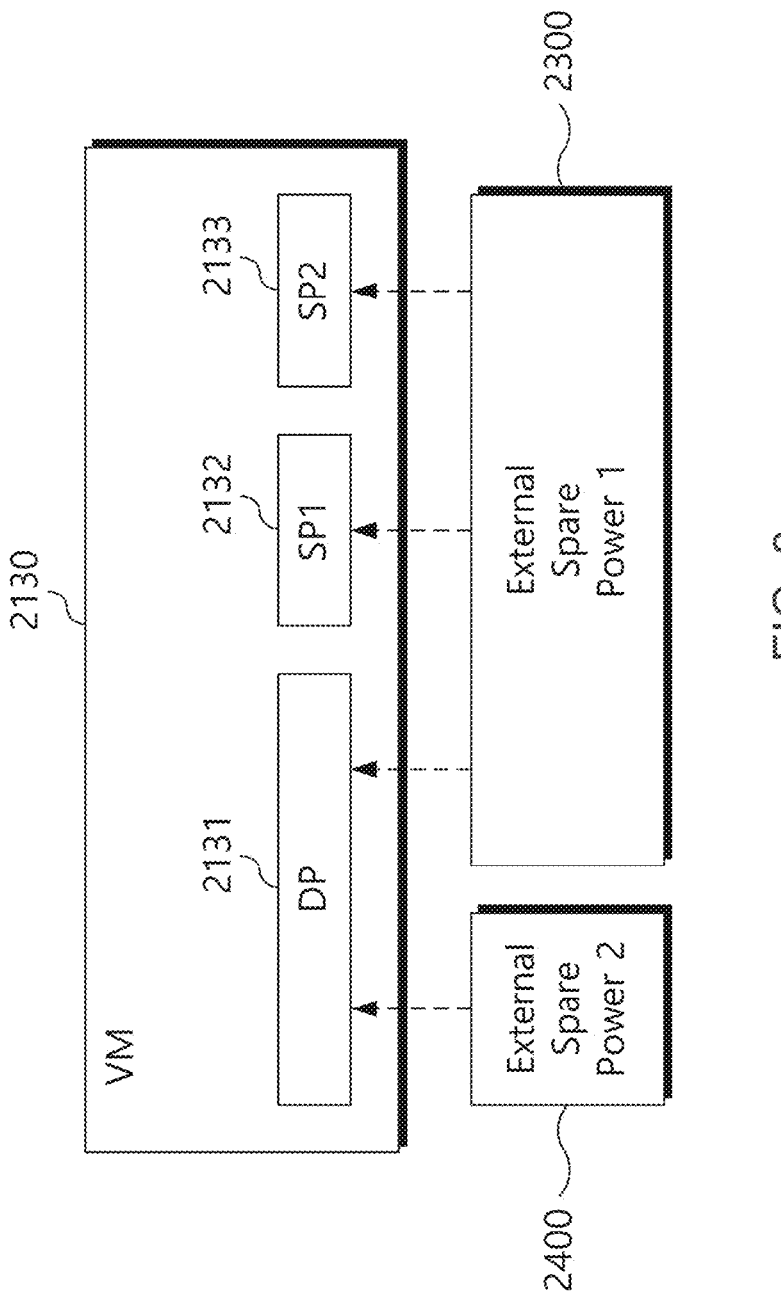
FIG. 8 is a diagram illustrating another example of a spare power supplying method of the volatile memory of FIG. 5.

FIG. 8 is a diagram illustrating another example of a spare power supplying method of the volatile memory of FIG. 5. Referring to FIGS. 5 and 8, the volatile memory 2130 may receive spare power through a plurality of external spare power sources (e.g., the first external spare power 2300 and the second external spare power 2400). The storage controller 2110 may divide the volatile memory 2130 into an area-received-duplication-power 2131 (e.g., iron space), a first area-received-spare-power 2132 and a second area-received-spare-power 2133 to the supply spare power. Under the control of the storage controller 2110, the power loss protection circuit 2140 may provide a spare power supply path to the area-received-duplication-power 2131, the first area-received-spare-power 2132, and the second area-received-spare-power 2133. The area-received-duplication-power 2131, the first area-received-spare-power 2132, and the second area-received-spare-power 2133 may have configurations and characteristics the same as or similar to those of the area-received-duplication-power 1131, the first area-received-spare-power 1132, and the second area-received-spare-power 1133 of FIG. 3. Hereinafter, descriptions of configurations and characteristics the same as or similar to those of the area-received-duplication-power 1131, the first area-received-spare-power 1132, and the second area-received-spare-power 1133 of FIG. 3 will be omitted to avoid redundancy.

According to some example embodiments, the area-received-duplication-power 2131 may redundantly receive spare power through the first external spare power 2300 and the second external spare power 2400. For example, the area-received-duplication-power 2131 may receive the spare power through the first external spare power 2300 and the second external spare power 2400 at the same time. As another example, the area-received-duplication-power 2131 may receive the spare power from the first external spare power 2300 primarily. When the first external spare power 2300 is depleted, the area-received-duplication-power 1131 may receive the spare power from the second external spare power 2400 secondarily. As another example, the area-received-duplication-power 2131 may receive the spare power from the second external spare power 2400 primarily. When the second external spare power 2400 is depleted, the area-received-duplication-power 1131 may receive the spare power from the first external spare power 2300 secondarily.

As such, when the main power of the host system 210 is insufficient or is shut off (e.g., SPO) (or when the main power drops to a specified or desired amount or less), a power supply in the area-received-duplication-power 2131 may be maintained as long as the first external spare power 2300, or the second external spare power 2400 are maintained, and data stored in the area-received-duplication-power 2131 may be protected. Accordingly, while the main power of the host system 210 is insufficient or the main power is shut off (or when the main power drops to a specified or desired amount or less), important data (e.g., meta data or encrypted data) stored in the area-received-duplication-power 2131 may be protected.

According to some example embodiments, the storage controller 2110 may determine a size of the area-received-duplication-power 2131. For example, the storage controller 2110 may set the size of the area-received-duplication-power 2131 to a predetermined or desired size. The storage controller 2110 may adjust the size of the area-received-duplication-power 2131 based on the remaining amount of power of each of (or alternatively, at least one of) the first external spare power 2300 and the second external spare power 2400. The storage controller 2110 may receive remaining amount of power information of each of (or alternatively, at least one of) the first external spare power 2300 and the second external spare power 2400 from the power loss protection circuit 2140.

According to some example embodiments, the first area-received-spare-power 2132 and the second area-received-spare-power 2133 may stepwise receive power by the first external spare power 2300. For example, the storage controller 2110 may set the first area-received-spare-power 2132 and the second area-received-spare-power 2133 based on the remaining amount of power of the first external spare power 2300. For example, when the remaining amount of power of the first external spare power 2300 is greater than a first remaining amount of power (e.g., 90%), the storage controller 2110 may supply spare power to both the first area-received-spare-power 2132 and the second area-received-spare-power 2133. When the remaining amount of power of the first external spare power 2300 is not greater than a second remaining amount of power (e.g., 60%) less than the first remaining amount of power, the storage controller 2110 may shut off a power supply of the second area-received-spare-power 2133 and may supply spare power only to the first area-received-spare-power 2132. When the remaining amount of power of the first external spare power 2300 is not greater than a third remaining amount of power (e.g., 30%) less than the second remaining amount of power, the storage controller 2110 may shut off the power supply of the first area-received-spare-power 2132 and may supply spare power only to the area-received-duplication-power 2131. However, this is an example. For example, the volatile memory 2130 may be divided into at least one or more power areas. Moreover, the area-received-duplication-power 2131 may be set to be included in the first area-received-spare-power 2132 or may be set separately from the first area-received-spare-power 2132.

According to some example embodiments, the storage controller 2110 may back up data in a power area, in which a power supply is shut off, to the non-volatile memory 1120. For example, when the first external spare power 2300 is not greater than the second remaining amount of power (e.g., 60%), the storage controller 2110 may move data stored in the second area-received-spare-power 2133 to the non-volatile memory 1120 and may shut off the power supply of the second area-received-spare-power 2133. When the first external spare power 2300 is not greater than the third remaining amount of power (e.g., 30%), the storage controller 2110 may move the data stored in the first area-received-spare-power 2132 to the non-volatile memory 1120 and may shut off the power supply of the first area-received-spare-power 2132.

According to some example embodiments, when the main power of the host system 210 is insufficient or is shut off (e.g., SPO) (or when the main power drops to a specified or desired amount or less), the storage controller 2110 may determine to supply power of the first area-received-spare-power 2132 and the second area-received-spare-power 2133. For example, when the first external spare power 2300 is not greater than the second remaining amount of power (e.g., 60%) while the main power of the host system 210 is insufficient or is shut off (e.g., SPO) (or when the main power drops to a specified or desired amount or less), the storage controller 2110 may back up data stored in the second area-received-spare-power 2133 to the non-volatile memory 1120 and may shut off the power supply of the second area-received-spare-power 2133. When the first external spare power 2300 is not greater than the third remaining amount of power (e.g., 30%) while the main power of the host system 210 is insufficient or is shut off (e.g., SPO) (or when the main power drops to a specified or desired amount or less), the storage controller 2110 may back up data stored in the first area-received-spare-power 2132 to the non-volatile memory 1120 and may shut off the power supply of the first area-received-spare-power 2132.

FIG. 9 is a flowchart illustrating a method of setting area-received-spare-power in a volatile memory in a storage device, according to some example embodiments. Referring to FIGS. 1 to 9, the storage device 1100 or 2100 may receive main power from the host system 110 or 210 at a normal mode. When the main power drops to a specified or desired amount or less, the storage device 1100 or 2100 may receive spare power through a spare power source.

According to some example embodiments, in operation S110, the storage controller 1110 or 2110 of the storage device 1100 or 2100 may set area-received-duplication-power in the volatile memory 1130 or 2130. For example, the storage controller 1110 or 2110 may classify the volatile memory 1130 or 2130 into the area-received-duplication-power 1131 or 2131 and at least one area-received-spare-power (e.g., the first area-received-spare-power 1132 or 2132 or the second area-received-spare-power 1133 or 2133).

According to some example embodiments, in operation S120, the storage controller 1110 or 2110 may set at least one area-received-spare-power in the volatile memory 1130 or 2130. For example, at least one area-received-spare-power (e.g., the first area-received-spare-power 1132 or 2132 or the second area-received-spare-power 1133 or 2133) may be set as an area separate from the area-received-duplication-power 1131 or 2131. As another example, the area-received-duplication-power 1131 or 2131 may be set as part of at least one area-received-spare-power.

According to some example embodiments, when main power from the host system 110 or 210 drops to a specified or desired amount or less, the storage controller 1110 or 2110 may supply spare power to area-received-duplication-power from a plurality of spare power sources. For example, when the main power is insufficient, the storage controller 1110 or 2110 may redundantly supply spare power to the area-received-duplication-power 1131 or 2131 from the internal spare power 1150 and the external spare power 1200. As such, the storage controller 1110 or 2110 may store important data (e.g., meta data or encrypted data) (or the highest priority data) in the area-received-duplication-power 1131 or 2131. Also, the size of the area-received-duplication-power 1131 or 2131 may be adjusted based on the size of important data.

According to some example embodiments, when the main power from the host system 110 drops to a specified or desired amount or less, in operation S140, the storage controller 1110 or 2110 may provide spare power to at least one area-received-spare-power from at least one of a plurality of spare power sources. For example, the storage controller 1110 or 2110 may receive spare power through one of the internal spare power source 1150 or 2150 or the plurality of external spare power sources 1200, 2300, and 2400. The storage controller 1110 or 2110 may store general data (e.g., data capable of being recovered through the host system 110 or the non-volatile memory 1120) (or next-order data) having importance lower than important data in at least one area-received-spare-power (e.g., the first area-received-spare-power 1132 or the second area-received-spare-power 1133). The size of at least one area-received-spare-power may be determined based on the size of the area-received-duplication-power 1131 or 2131 or the remaining amount of power of a spare power source.

According to some example embodiments, in operation S150, the storage controller 1110 or 2110 may differentially supply spare power to at least one area-received-spare-power from a plurality of spare power sources based on the remaining amount of power of the plurality of spare power sources. For example, when the main power is insufficient, the storage controller 1110 or 2110 may maintain a spare power supply to the area-received-duplication-power 1131 or 2131 as long as possible for the purpose of protecting the important data. As such, the storage controller 1110 or 2110 may differentially adjust the supply of spare power for at least one area-received-spare-power (e.g., the first area-received-spare-power 1132 or the second area-received-spare-power 1133).

According to some example embodiments, in operation S160, the storage controller 1110 or 2110 may move data stored in the volatile memory 1130 or 2130 to the non-volatile memory 1120 or 2120 based on the differential supply of spare power. For example, because data stored in area-received-spare-power where a spare power supply is shut off is lost, the storage controller 1110 or 2110 may move data stored in at least one area-received-spare-power (e.g., the first area-received-spare-power 1132 or the second area-received-spare-power 1133) to a non-volatile memory device before the spare power supply is shut off.

The above description refers to detailed example embodiments for carrying out the present disclosure. Example embodiments in which a design is changed simply or which are easily changed may be included in the present disclosure as well as some example embodiments described above. In addition, technologies that are easily changed and implemented by using the above example embodiments may be included in the present disclosure. While the present disclosure has been described with reference to some example embodiments thereof, it will be apparent to those of ordinary skill in the art that various changes and modifications may be made thereto without departing from the spirit and scope of the present disclosure as set forth in the following claims.

According to some example embodiments of the present disclosure, when sudden main power shortage (e.g., SPO or power glitch) of a host system occurs, important data stored in a part of a volatile memory included in a storage device may be prevented from being lost.

Moreover, according to some example embodiments of the present disclosure, when the sudden main power shortage (e.g., SPO or power glitch) occurs, the power retention time of other areas of the volatile memory, to which spare power is supplied, may be extended by shutting off power of some areas of the volatile memory. In this way, important data stored in the volatile memory may be safely backed up to a non-volatile memory device.

Furthermore, according to some example embodiments of the present disclosure, when the sudden main power shortage occurs, the power retention time of an area where important data is stored may be extended by using different spare power sources (e.g., an internal spare power source, an external spare power source, a capacitor, or a battery) for each area of the volatile memory. In this way, the important data stored in the volatile memory may be safely backed up to the non-volatile memory device.

Any of the elements and/or functional blocks disclosed above may include or be implemented in processing circuitry such as hardware including logic circuits; a hardware/software combination such as a processor executing software; or a combination thereof. For example, the storage controller 150 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A storage device comprising:
a non-volatile memory configured to input or output data at a request of a host system;
a volatile memory configured to temporarily store data input to or output from the non-volatile memory;
an internal spare power source configured to supply power to a part of the volatile memory in response to main power from the host system dropping to a first amount or less; and
a storage controller configured to control data input or data output of the non-volatile memory and the volatile memory,
wherein, the storage controller is configured to
in response to the main power dropping to the first amount or less, divide the volatile memory into area-received-duplication-power, in which higher priority data is stored, and at least two area-received-spare-power in which lower priority data is stored,
redundantly supply spare power to the area-received-duplication-power that stores the higher priority data, wherein the spare power is supplied from at least two external spare power sources and the internal spare power source, and
supply spare power to the at least two area-received-spare-power that stores the lower priority data, wherein the spare power is supplied from the at least two external spare power sources, and
wherein the internal spare power source is included in the storage device, and the at least two external spare power sources are external to the storage device.

2. The storage device of claim 1, wherein the storage controller is configured to set a size of the area-received-duplication-power as a first size.

3. The storage device of claim 1, wherein the storage controller is configured to cause a size of the area-received-duplication-power to be stepwise reduced from a first size based on a remaining amount of power of the internal spare power source or the at least two external spare power sources.

4. The storage device of claim 1, wherein the storage controller is configured to set the area-received-duplication-power in one physical memory chip included in the volatile memory.

5. The storage device of claim 1, wherein the storage controller is configured to set the area-received-duplication-power across at least two physical memory chips included in the volatile memory.

6. The storage device of claim 1, wherein the storage controller is configured to:
supply the spare power to the area-received-duplication-power from the internal spare power source and the at least two external spare power sources at a same time; and cause the internal spare power source to supply power to the area-received -duplication-power and cause at least one of the at least two external spare power sources to charge the internal spare power source, or cause the internal spare power source to primarily supply power to the area-received-duplication-power and cause at least one of the at least two external spare power sources source to supply the spare power to the area-received-duplication-power in response to the internal spare power source being discharged.

7. A storage device comprising:

a non-volatile memory configured to input or output data at a request of a host system;

a volatile memory configured to temporarily store data input to or output from the non-volatile memory; and a storage controller configured to control data input or data output of the non- volatile memory and the volatile memory, wherein the storage controller is configured to in response to main power from the host system dropping to a first amount or less, supply spare power to the volatile memory through a spare power source, divide the volatile memory into pieces of area-received-spare-power, and differentially supply spare power to the pieces of area-received-spare-power based on a remaining amount of power of the spare power source, and wherein the storage controller is further configured to individually supply the spare power to the pieces of area-received-spare-power.

8. The storage device of claim 7, wherein the pieces of area-received-spare-power includes a first area-received-spare-power and a second area-received-spare-power, and the storage controller is configured to in response to the spare power source having a first remaining amount of power or more, supply the spare power to the first area-received-spare-power and the second area-received-spare-power from the spare power source, and in response to the spare power source having a second remaining amount of power or less, shut off a power supply of the second area-received-spare-power and supply the spare power to the first area-received-spare-power from the spare power source, wherein the second remaining amount of power is less than the first remaining amount of power.

9. The storage device of claim 8, wherein the storage controller is configured to, in response to the remaining amount of power of the spare power source dropping to the second remaining amount of power or less, back up data stored in the second area-received-spare-power to the non-volatile memory and shut off the power supply of the second area-received-spare-power.

10. The storage device of claim 8, wherein the storage controller is configured to, in response to the spare power source having a third remaining amount of power or less, shut off a power supply of the first area-received-spare-power, wherein the third remaining amount of power is less than the second remaining amount of power.

11. The storage device of claim 10, wherein the storage controller is configured to, in response to the remaining amount of power of the spare power source dropping to the third remaining amount of power or less, back up data stored in the first area-received-spare-power to the non-volatile memory and shut off the power supply of the first area-received-spare-power.

12. The storage device of claim 7, wherein the spare power source includes an internal spare power source, which is included in the storage device, and an external spare power source present outside the storage device, and the pieces of area-received-spare-power include an area-received-duplication-power configured to redundantly receive power through the internal spare power source and the external spare power source, and a first area-received-spare-power and a second area-received-spare-power, each of which differentially receives the spare power through the external spare power source based on the remaining amount of power of the external spare power source.

13. The storage device of claim 12, further comprising:

a power loss protection circuit configured to provide a power supply path between the volatile memory, the internal spare power source, and the external spare power source, wherein the power loss protection circuit is configured to redundantly supply power to the area-received-duplication-power from the internal spare power source and the external spare power source under control of the storage controller.

14. The storage device of claim 13, wherein the power loss protection circuit is configured to, in response to the external spare power source having a first remaining amount of power or more, supply the spare power to the first area-received-spare-power and the second area-received-spare-power from the external spare power source, and in response to the external spare power source having a second remaining amount of power or less, shut off a power supply of the second area-received-spare-power and supply the spare power to the first area-received-spare-power from the external spare power source, wherein the second remaining amount of power is less than the first remaining amount of power.

15. The storage device of claim 14, wherein, in response to a power supply from the host system being shut off, the power loss protection circuit is configured to, in response to the external spare power source having a third remaining amount of power or less, shut off a power supply of the first area-received-spare-power and supply the spare power to only the area-received-duplication-power from the external spare power source, wherein the third remaining amount of power is less than the second remaining amount of power.

16. A storage device comprising:

a non-volatile memory configured to input or output data at a request of a host system;

a volatile memory configured to temporarily store data input to or output from the non-volatile memory;

an internal spare power source configured to supply power to a part of the volatile memory in response to main power from the host system dropping to a first amount or less; and a storage controller configured to control data input or data output of the non- volatile memory and the volatile memory, wherein, in response to the main power from the host system dropping to the first amount or less, the volatile memory includes area-received-duplication-power configured to redundantly receive spare power from the internal spare power source and at least two external spare power sources among a plurality of external spare power sources, and at least two pieces of area-received-spare-power, each piece of area-received-spare-power individually receiving the spare power from one of the at least two external spare power sources, and wherein the internal spare power source is included in the storage device, and the at least two external spare power sources of the plurality of external spare power sources are external to the storage device.

17. The storage device of claim 16, wherein the storage controller is configured to cause the spare power to be redundantly supplied from the internal spare power source and a first external spare power source of the at least two external spare power sources to the area-received-duplication-power, cause the spare power to be supplied from the first external spare power source to a first area-received-spare-power among the at least two pieces of area-received-spare-power, and cause the spare power from a second external spare power source of the at least two external spare power sources to a second area-received-spare-power among the at least two pieces of area-received-spare-power.

18. The storage device of claim 16, wherein the storage controller is configured to cause power to be redundantly supplied from a first external spare power source and a second external spare power source of the at least two external spare power sources to the area-received-duplication-power, cause power to be supplied from the first external spare power source to a first area-received-spare-power among the at least two pieces of area-received-spare-power, and cause power to be supplied from the internal spare power source to the area- received-duplication-power.

19. The storage device of claim 16, wherein the storage controller is configured to cause power to be redundantly supplied from a first external spare power source and a second external spare power source of the at least two external spare power sources to the area-received-duplication-power, cause power to be redundantly supplied from the first external spare power source to a first area-received-spare-power and a second area-received-spare-power among the at least two pieces of area-received-spare-power, and shut off a power supply of the second area-received-spare-power in response to the first external spare power source dropping to a first remaining amount of power or less, and cause a power supply of the first area-received-spare-power and the second area-received-spare-power to be shut off in response to the first external spare power source dropping to a second remaining amount of power or less, wherein the second remaining amount of power is less than the first remaining amount of power.

20. The storage device of claim 16, further comprising:

a power loss protection circuit configured to differentially supply the spare power from the plurality of external spare power sources to the at least two pieces of area-received-spare-power in response to the main power from the host system dropping to the first amount or less.

* * * * *